(12) United States Patent
Lin

(10) Patent No.: US 12,124,650 B2
(45) Date of Patent: Oct. 22, 2024

(54) TOUCH-CONTROL PANEL AND TOUCH-CONTROL DISPLAY APPARATUS

(71) Applicant: HEFEI VISIONOX TECHNOLOGY CO., LTD., Anhui (CN)

(72) Inventor: Fuyin Lin, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/458,567

(22) Filed: Aug. 30, 2023

(65) Prior Publication Data

US 2023/0409141 A1    Dec. 21, 2023

Related U.S. Application Data

(63) Continuation of application No. PCT/CN2022/084980, filed on Apr. 2, 2022.

(30) Foreign Application Priority Data

Jun. 30, 2021   (CN) .......................... 202110738467.6

(51) Int. Cl.
   *G06F 3/041*      (2006.01)
   *G06F 3/044*      (2006.01)

(52) U.S. Cl.
   CPC ........ *G06F 3/04164* (2019.05); *G06F 3/0412* (2013.01); *G06F 3/0445* (2019.05); *G06F 3/0446* (2019.05); *G06F 2203/04112* (2013.01)

(58) Field of Classification Search
   None
   See application file for complete search history.

(56) References Cited

U.S. PATENT DOCUMENTS

2014/0375910 A1    12/2014  Tada et al.
2018/0157354 A1     6/2018  Blondin et al.
                   (Continued)

FOREIGN PATENT DOCUMENTS

CN        105183259 A       12/2015
CN        105718128 A        6/2016
                   (Continued)

OTHER PUBLICATIONS

International Search Report issued on Jun. 16, 2022, in corresponding International Patent Application No. PCT/CN2022/084980, 5 pages.

(Continued)

*Primary Examiner* — Nicholas J Lee
(74) *Attorney, Agent, or Firm* — Maier & Maier, PLLC

(57) ABSTRACT

A touch-control panel and a touch-control display apparatus. The touch-control panel includes multiple touch-control electrode blocks and multiple touch-control traces. The touch-control traces are configured to input a drive signal to the touch-control electrode blocks. Each touch-control electrode block includes a first conductive layer and a second conductive layer disposed in a stacked manner, a first insulating layer is disposed between the first conductive layer and the second conductive layer, and the first conductive layer and the second conductive layer are electrically connected. Each touch-control trace includes a first trace layer and a second trace layer disposed in a stacked manner, a second insulating layer is disposed between the first trace layer and the second trace layer, and the first trace layer and the second trace layer are electrically connected.

20 Claims, 13 Drawing Sheets

(56) References Cited

U.S. PATENT DOCUMENTS

2023/0078853 A1* 3/2023 Zhang .................. G06F 3/0446
                                                    345/174
2023/0097832 A1* 3/2023 Kuo ..................... G06F 3/0446
                                                    345/173

FOREIGN PATENT DOCUMENTS

| CN | 108614652 A | 10/2018 |
| CN | 108776555 A | 11/2018 |
| CN | 208673308 U |  3/2019 |
| CN | 113467639 A | 10/2021 |

OTHER PUBLICATIONS

Office Action issued on Nov. 18, 2022, in corresponding Chinese Patent Application No. 202110738467.6, 12 pages.

* cited by examiner

TOUCH-CONTROL PANEL AND TOUCH-CONTROL DISPLAY APPARATUS

CROSS-REFERENCE TO RELATED APPLICATIONS

This application is a continuation of International Patent Application No. PCT/CN2022/084980, filed on Apr. 2, 2022, which claims priority to Chinese Patent Application No. 202110738467.6 filed on Jun. 30, 2021, disclosures of both of which are incorporated herein by reference in their entireties.

TECHNICAL FIELD

The present application relates to the technical field of display panels, for example, to a touch-control panel and a touch-control display apparatus.

BACKGROUND

With the development of touch-control technologies and the improvement of people's living standards, touch-control display apparatuses are widely used, however, the cost of the touch-control display apparatuses is relatively high.

SUMMARY

The present application provides a touch-control panel and a touch-control display apparatus. The touch-control panel may adopt the same drive integrated circuit chip (IC) as a display panel, so that the cost of the touch-control panel is reduced, and thus the cost of the touch-control display apparatus is reduced.

The present application provides a touch-control panel. The touch-control panel includes multiple touch-control electrode blocks and multiple touch-control traces. Each touch-control electrode block includes a first conductive layer and a second conductive layer disposed in a stacked manner, a first insulating layer is disposed between the first conductive layer and the second conductive layer, and the first conductive layer and the second conductive layer of the each touch-control electrode block are electrically connected. The multiple touch-control traces are configured to input a drive signal to the multiple touch-control electrode blocks, each touch-control trace includes a first trace layer and a second trace layer disposed in a stacked manner, a second insulating layer is disposed between the first trace layer and the second trace layer, and the first trace layer and the second trace layer of the each touch-control trace are electrically connected. The first conductive layer and the first trace layer are disposed on a same layer, the second conductive layer and the second trace layer are disposed on a same layer, and the first insulating layer and the second insulating layer are disposed on a same layer.

The present application further provides a touch-control display apparatus. The touch-control display apparatus includes a display panel disposed in a stacked manner and the touch-control panel described above. The display panel includes a display region, and the multiple touch-control electrode blocks in the touch-control panel are correspondingly disposed in the display region.

According to the touch-control panel provided in the present application, the each touch-control electrode block includes the first conductive layer and the second conductive layer disposed in a stacked manner, and the first conductive layer and the second conductive layer of the each touch-control electrode block are electrically connected, so that the resistance of the each touch-control electrode block is relatively small. The first trace layer and the second trace layer of the each touch-control trace are electrically connected, so that the resistance of the touch-control trace is relatively small, the requirement on the drive capability of the touch-control drive IC is reduced, whereby the touch-control panel may adopt the same drive IC as the display panel, and further, the cost of the touch-control panel is reduced, and thus the cost of the touch-control display apparatus is reduced, moreover, the space occupied by the touch-control panel in the touch-control display apparatus is reduced, which is conductive to reducing the volume of the touch-control display apparatus. The first conductive layer and the first trace layer are disposed on the same layer, the second conductive layer and the second trace layer are disposed on the same layer, and the first insulating layer and the second insulating layer are disposed on the same layer, so that the facing area of the touch-control electrode blocks and the touch-control traces connected to other touch-control electrode blocks is greatly reduced, whereby the parasitic capacitance between the touch-control electrode blocks and the touch-control traces connected to other touch-control electrode blocks is significantly reduced, and thus the touch-control effect of the touch-control panel is improved.

DETAILED DESCRIPTION

Figure 1:
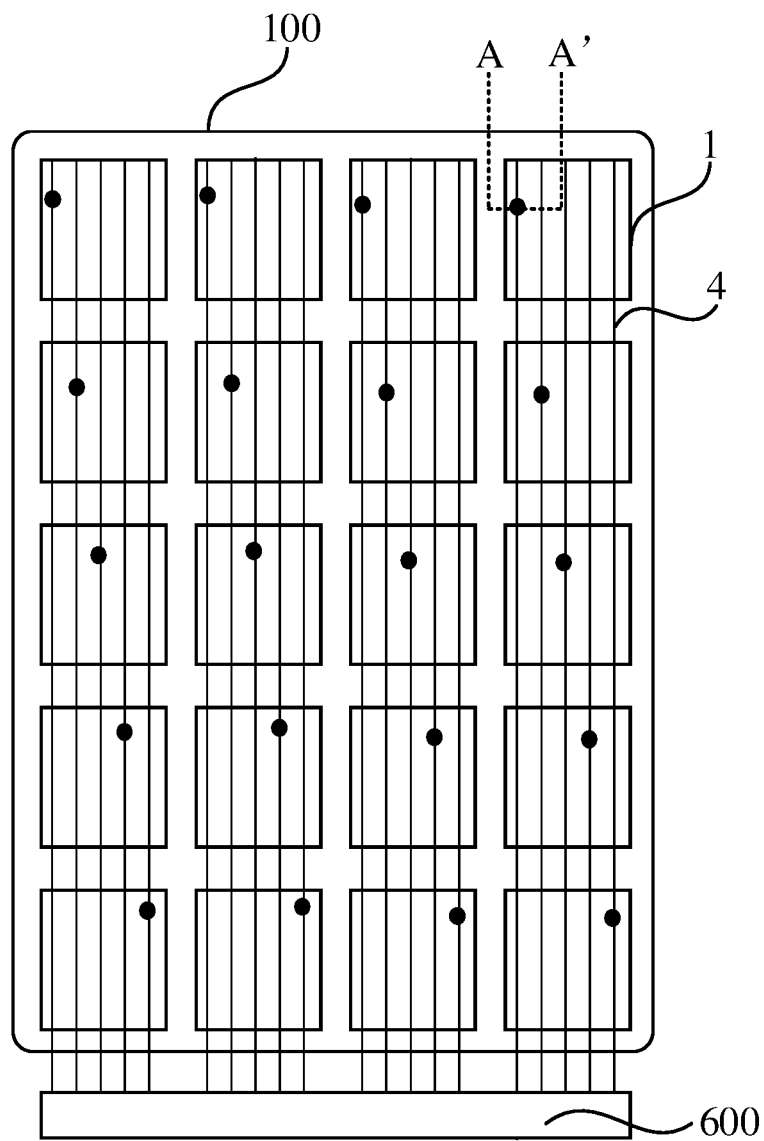
FIG. 1 is a schematic structural diagram of a touch-control panel according to an embodiment of the present application.

The present application will be described hereinafter in conjunction with drawings and embodiments. The specific embodiments described herein are merely illustrative of the present application. For ease of description, only parts related to the present application are shown in the drawings.

Figure 2:
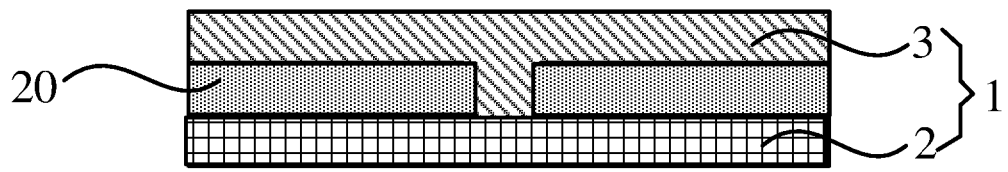
FIG. 2 is a schematic cross-sectional view of a touch-control panel of FIG. 1 taken along a direction of AA' according to an embodiment of the present application.
Figure 3:
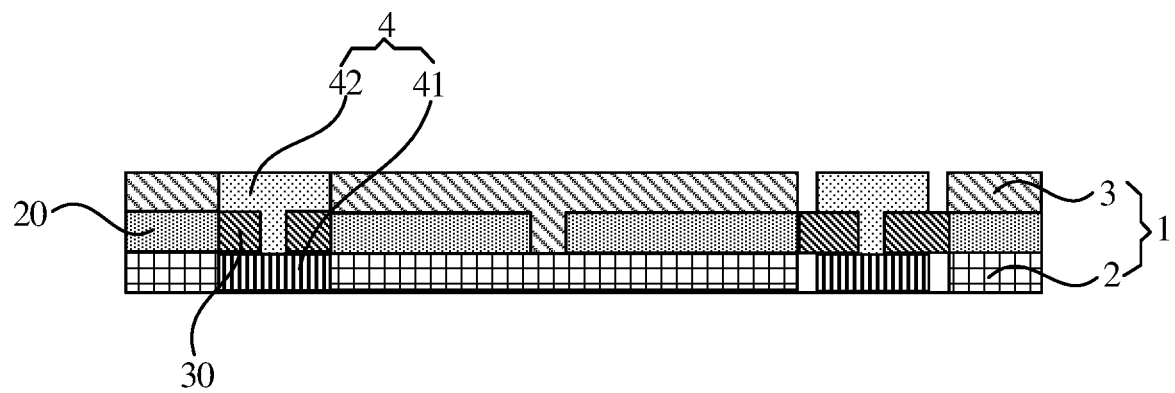
FIG. 3 is a schematic cross-sectional view of another touch-control panel of FIG. 1 taken along a direction of AA' according to an embodiment of the present application.

FIG. 1 is a schematic structural diagram of a touch-control panel according to an embodiment of the present application. FIG. 2 is a schematic cross-sectional view of a touch-control panel of FIG. 1 taken along a direction of AA' according to an embodiment of the present application. In conjunction with FIGS. 1 and 2, FIG. 3 is a schematic cross-sectional view of another touch-control panel of FIG. 1 taken along a direction of AA' according to an embodiment of the present application. A touch-control panel 100 provided in the embodiment of the present application includes multiple touch-control electrode blocks 1 and multiple touch-control traces 4. The touch-control traces 4 are configured to input a drive signal to the touch-control electrode blocks 1. Each touch-control electrode block 1 includes a first conductive layer 2 and a second conductive layer 3 disposed in a stacked manner, a first insulating layer 20 is disposed between the first conductive layer 2 and the second conductive layer 3, and the first conductive layer 2 and the second conductive layer 3 of the each touch-control electrode block 1 are electrically connected. Each touch-control trace 4 includes a first trace layer 41 and a second trace layer 42 disposed in a stacked manner, a second insulating layer 30 is disposed between the first trace layer 41 and the second trace layer 42, and the first trace layer 41 and the second trace layer 42 of the each touch-control trace 4 are electrically connected. The first conductive layer 2 and the first trace layer 41 are disposed on a same layer, the second conductive layer 3 and the second trace layer 42 are disposed on a same layer, and the first insulating layer 20 and the second insulating layer 30 are disposed on a same layer.

A display panel may include a light-emitting unit, and the touch-control panel 100 may be disposed on a light emission side of the light-emitting unit. The touch-control panel 100 may include the multiple touch-control electrode blocks 1. During the touch-control detection, the drive IC 600 is configured to send a touch-control signal to the touch-control electrode blocks 1 so as to charge the touch-control electrode blocks 1. During the touch-control detection, the drive IC 600 sends a touch-control signal to the touch-control electrode blocks 1 to charge the touch-control electrode blocks 1, and detects a capacitance value on the touch-control electrode blocks 1 in real time, where the touch-control signal may be a pulse signal. When a finger is close to the touch-control panel 100, a touch-control capacitance is formed between the each touch-control electrode block 1 and the finger close to the touch-control panel 100, and the drive IC 600 may detect a touch-control position of the finger by detecting a change in the capacitance of the each touch-control electrode block 1. The each touch-control electrode block 1 includes the first conductive layer 2 and the second conductive layer 3 disposed in a stacked manner, and the first conductive layer 2 and the second conductive layer 3 of the each touch-control electrode block 1 are electrically connected. For touch-control electrode blocks 1 with the same area, by comparing touch-control electrode blocks including two layers of conductive layers with touch-control electrode blocks including a single layer of conductive layer, two layers of conductive layers disposed in a stacked manner being electrically connected is equivalent to the two layers of conductive layers of the touch-control electrode blocks being connected in parallel, so that the resistance of the touch-control electrode blocks 1 including two layers of conductive layers is relatively small, the requirement on the drive capability of the touch-control drive IC 600 can be reduced, whereby the touch-control panel may adopt the same drive IC as the display panel, and further, the cost of the touch-control panel is reduced, and thus the cost of a touch-control display apparatus is reduced, moreover, the space occupied by the touch-control panel in the touch-control display apparatus is reduced, which is conductive to reducing the volume of the touch-control display apparatus.

In conjunction with FIG. 1 and FIG. 3, the touch-control traces 4 are configured to input the drive signal to the touch-control electrode blocks 1. The touch-control trace 4 includes two layers of trace layers, and the first trace layer 41 and the second trace layer 42 of the each touch-control trace 4 are electrically connected. For touch-control traces 4 with the same width, by comparing touch-control traces including two layers of trace layers with touch-control traces including a single layer of trace layer, two layers of trace layers disposed in a stacked manner being electrically connected is equivalent to the two layers of trace layers of the touch-control traces being connected in parallel, so that the resistance of the touch-control traces 4 can be reduced, the requirement on the drive capability of the drive IC can be reduced, the difficulty of the touch-control drive can be reduced, and moreover, the touch-control traces 4 have a relatively small resistance, which can reduce the voltage drop of signals transmitted on the touch-control traces 4, reduce the signal loss, and improve the touch-control sensitivity of the touch-control panel.

In conjunction with FIGS. 1 and 3, the first conductive layer 2 and the first trace layer 41 are disposed on the same layer, the second conductive layer 3 and the second trace layer 42 are disposed on the same layer, and the first insulating layer 20 and the second insulating layer 30 are disposed on the same layer. On the one hand, the facing area of the touch-control electrode blocks 1 and the touch-control traces 4 connected to other touch-control electrode blocks 1 is greatly reduced, so that the parasitic capacitance between the touch-control electrode blocks 1 and the touch-control traces 4 connected to other touch-control electrode blocks 1 is significantly reduced, and thus the touch-control effect of the touch-control panel is improved. On the other hand, the first conductive layer 2 and the first trace layer 41 are disposed on the same layer, and the second conductive layer 3 and the second trace layer 42 are disposed on the same layer, so that the touch-control panel is lighter and thinner, and the space occupied by the touch-control panel is made less, which is conductive to achieving the lightness and thinning of the touch-control display apparatus.

According to the touch-control panel provided in this embodiment, the each touch-control electrode block includes the first conductive layer and the second conductive layer disposed in a stacked manner, and the first conductive layer and the second conductive layer of the each touch-control electrode block are electrically connected, so that the resistance of the each touch-control electrode block is relatively small. The first trace layer and the second trace layer of the each touch-control trace are electrically connected, so that the resistance of the touch-control trace is relatively small, the requirement on the drive capability of the touch-control drive IC is reduced, whereby the touch-control panel may adopt the same drive IC as the display panel, and further, the cost of the touch-control panel is reduced, and thus the cost of the touch-control display apparatus is reduced, moreover, the space occupied by the touch-control panel in the touch-control display apparatus is reduced, which is conductive to reducing the volume of the touch-control display apparatus. The first conductive layer and the first trace layer are disposed on the same layer, the second conductive layer and the second trace layer are disposed on the same layer, and the first insulating layer and the second insulating layer are disposed on the same layer, so that the facing area of the touch-control electrode blocks and the touch-control traces connected to other touch-control electrode blocks is greatly reduced, whereby the parasitic capacitance between the touch-control electrode blocks and the touch-control traces connected to other touch-control electrode blocks is significantly reduced, and thus the touch-control effect of the touch-control panel is improved.

Figure 4:
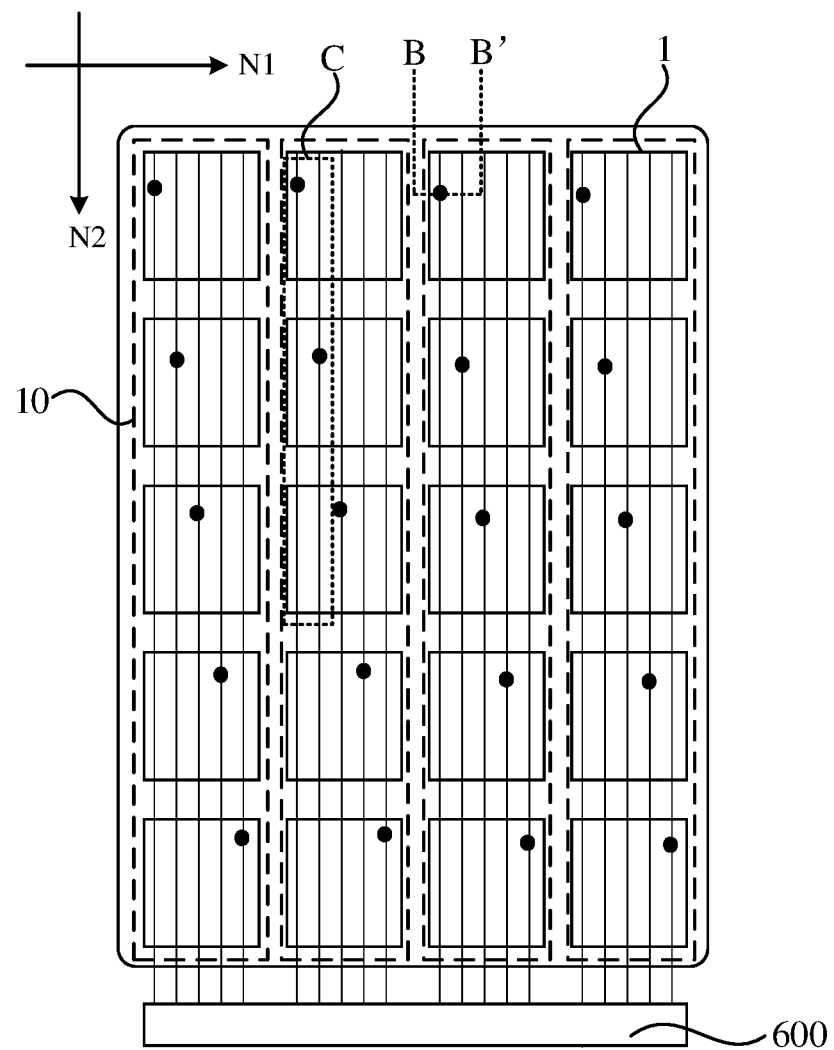
FIG. 4 is a schematic structural diagram of another touch-control panel according to an embodiment of the present application.
Figure 5:
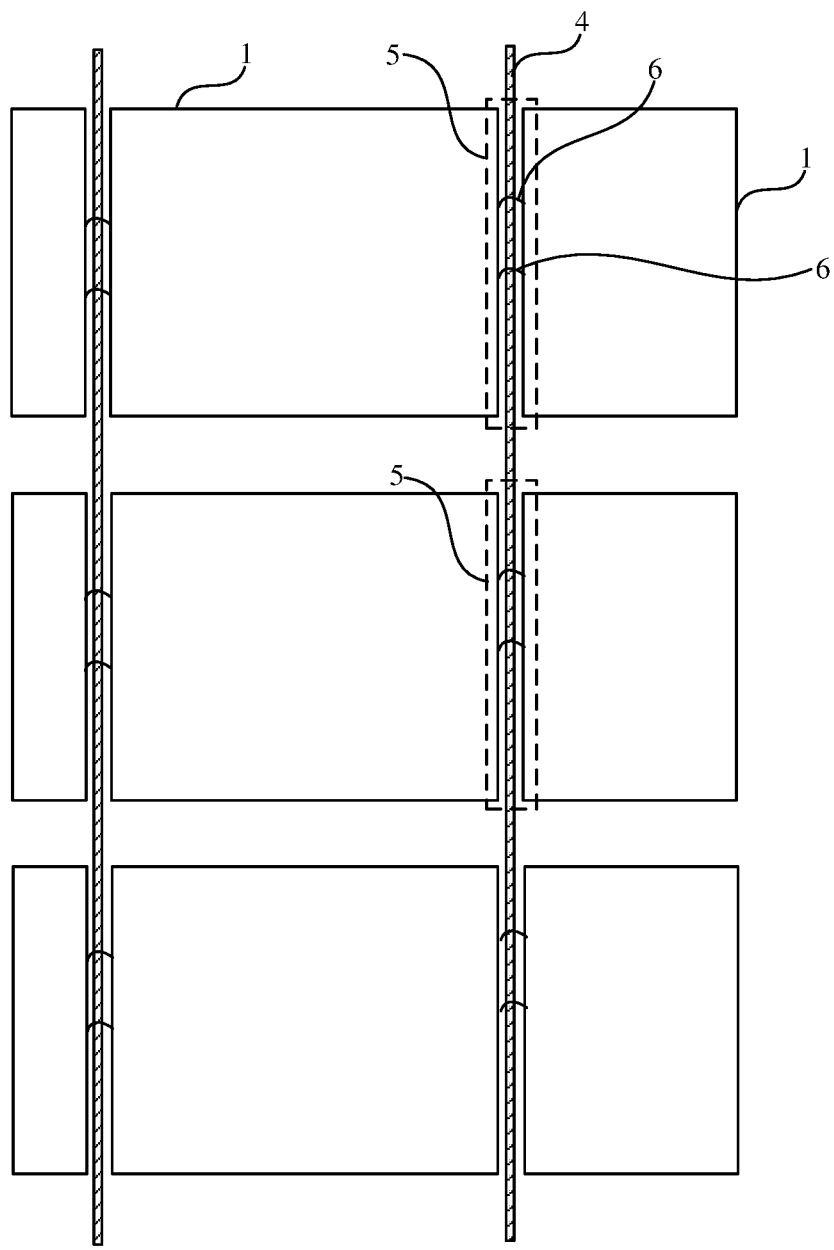
FIG. 5 is a schematic enlarged view of a touch-control panel of FIG. 4 at a region of C according to an embodiment of the present application.

FIG. 4 is a schematic structural diagram of another touch-control panel according to an embodiment of the present application. FIG. 5 is a schematic enlarged view of a touch-control panel of FIG. 4 at a region of C according to an embodiment of the present application. On the basis of the above-described embodiments, in conjunction with FIGS. 1, 4 and 5, multiple touch-control electrode blocks 1 sequentially arranged in a second direction N2 form multiple touch-control electrode columns 10, the multiple touch-control electrode columns 10 are sequentially arranged in a first direction N1, and the second direction N2 and the first direction N1 intersect each other. Each touch-control electrode block 1 includes at least one opening 5 extending in the second direction N2. The touch-control traces 4 extend in the second direction N2, and each touch-control trace 4 is configured to penetrate through the at least one opening 5. Each touch-control electrode block 1 includes at least one jumper wire 6, and the at least one jumper wire 6 is configured to be electrically connected to regions, located on two sides of the at least one opening 5, of the each touch-control electrode block 1. FIG. 4 exemplarily shows a case where the second direction N2 and the first direction N1 are perpendicular to each other, which is not limited in any way herein.

Each touch-control trace 4 at least starts to extend from the touch-control electrode block 1 electrically connected to the each touch-control trace 4, and extend up to the drive IC 600. The touch-control traces 4 is configured to penetrate through the multiple touch-control electrode blocks 1, that is, the touch-control trace 4 and the touch-control electrode block 1 are located in a same region, so that the total area of the touch-control region and the wiring region of the touch-control panel can be reduced, and the area of the touch-control panel can be reduced, thereby reducing the area occupied by the touch-control panel in the touch-control display apparatus. Generally, the touch-control electrode blocks 1 of the touch-control display apparatus are located in a display region of the touch-control display apparatus. In the embodiments of the present application, both the touch-control traces 4 and the touch-control electrode blocks 1 may be disposed in the display region, the touch-control traces 4 do not need to occupy the frame region, thereby saving the trace space in the frame region of the touch-control display apparatus, and facilitating the narrow frame of the touch-control display apparatus. The touch-control traces 4 extend in the second direction N2, and each touch-control trace 4 is configured to penetrate through the at least one opening 5, so that the facing area of the touch-control electrode blocks 1 and touch-control traces 4 connected to other touch-control electrode blocks 1 is greatly reduced, whereby the parasitic capacitance between the touch-control electrode blocks 1 and the touch-control traces 4 connected to other touch-control electrode blocks 1 is significantly reduced, and thus the touch-control precision of the touch-control panel is improved.

In some embodiments, openings 5 included in the each touch-control electrode block of the multiple touch-control electrode blocks 1 are the same in number, and openings 5 through which the multiple touch-control traces 4 penetrate are the same in number.

Referring to FIG. 4, each touch-control trace 4 extends from a first touch-control electrode block 1 to a last touch-control electrode block 1 in the touch-control electrode column 10. A number of touch-control electrode blocks 1 through which each of the multiple touch-control traces 4 passes are the same, and a number of touch-control traces 4 penetrating through each of the multiple touch-control electrode blocks 1 are the same. Although a relative area of the touch-control trace 4 and the finger is much less than a relative area of the touch-control electrode block 1 and the finger when the finger touches and controls the touch-control panel, a certain capacitance is still generated between the touch-control trace 4 and the finger, which causes interference to the touch-control detection. The number of touch-control traces 4 through which each of the multiple touch-control electrode blocks 1 passes is disposed to be the same, so that the touch-control trace 4 has the same interference signal to each touch-control electrode block 1, and the interference signal may be filtered out by a late noise processing and the like, thereby improving the touch-control detection precision. In addition, each touch-control trace 4 is overlapped with the touch-control electrode block 1 only at the jumper wire 6, thereby greatly reducing the parasitic capacitance between the touch-control trace 4 and the touch-control electrode block 1 outside the jumper wire 6, and improving the touch-control precision of the touch-control panel.

Figure 6:
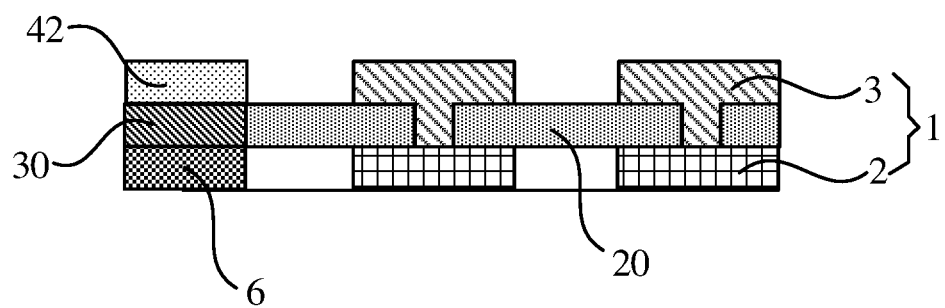
FIG. 6 is a schematic cross-sectional view of a touch-control panel of FIG. 4 taken along a direction of BB' according to an embodiment of the present application.
Figure 7:
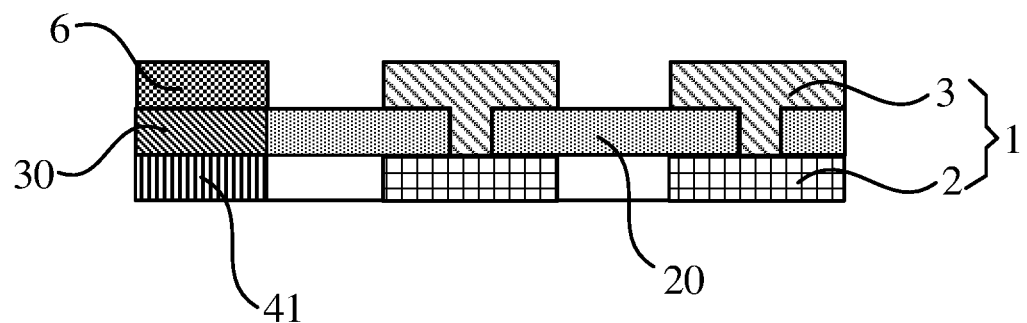
FIG. 7 is a schematic cross-sectional view of another touch-control panel of FIG. 4 taken along a direction of BB' according to an embodiment of the present application.

FIG. 6 is a schematic cross-sectional view of a touch-control panel of FIG. 4 taken along a direction of BB' according to an embodiment of the present application. On the basis of the above-described embodiments, referring to FIG. 6, the jumper wire 6 and the first conductive layer 2 are disposed on a same layer, and a portion where the touch-control traces 4 are overlapped with the jumper wire 6 includes the second trace layer 42. In some embodiments, a portion where the touch-control traces 4 are overlapped with the jumper wire 6 includes only the second trace layer 42. Alternatively, FIG. 7 is a schematic cross-sectional view of another touch-control panel of FIG. 4 taken along a direction of BB' according to embodiment of the present application. On the basis of the above-described embodiments, referring to FIG. 7, the jumper wire 6 and the second conductive layer 3 are disposed on a same layer, and a portion where the touch-control traces 4 are overlapped with the jumper wire 6 includes the first trace layer 41. In some embodiments, a portion where the touch-control traces 4 are overlapped with the jumper wire 6 includes only the first trace layer 41.

The wiring space is left for the jumper wire 6 on the first trace layer 41 or the second trace layer 42 of the touch-control trace 4, so that it is not necessary to provide other film layers to achieve the electrical connection of the touch-control electrode blocks 1 in the regions located at two sides of the opening 5, thereby ensuring that the touch-control panel has a relatively small thickness.

Figure 8:
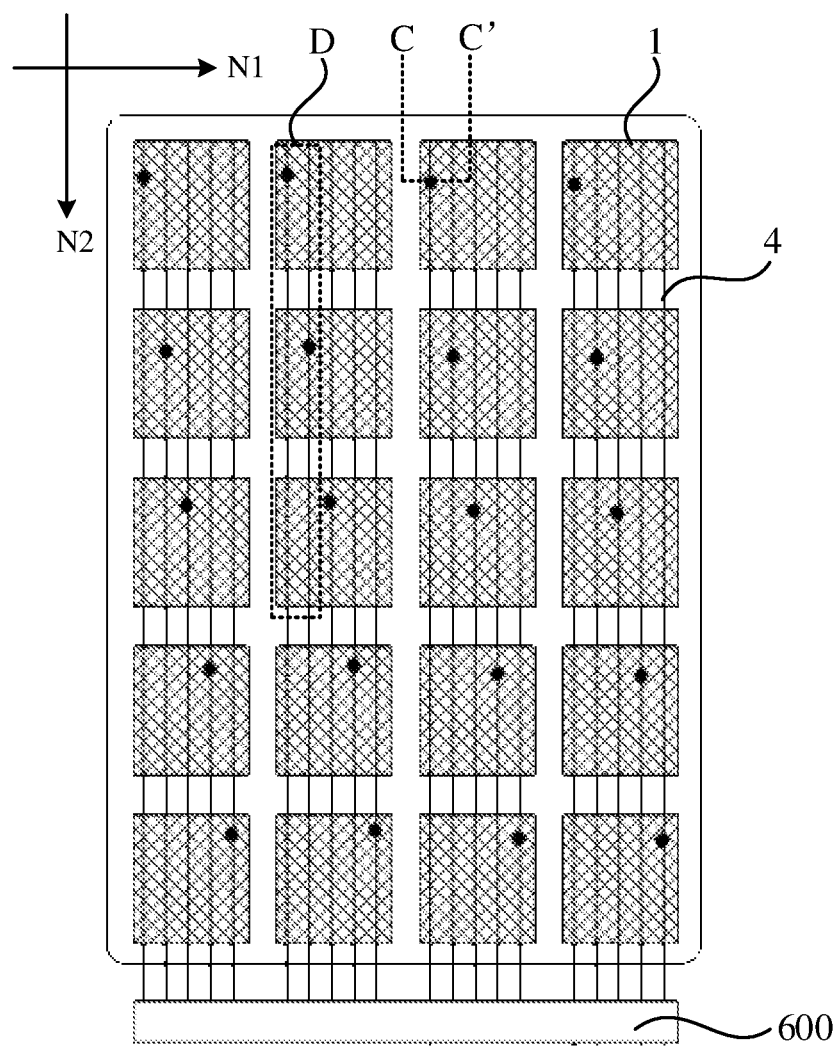
FIG. 8 is a schematic structural diagram of another touch-control panel according to an embodiment of the present application.

FIG. 8 is a schematic structural diagram of another touch-control panel according to an embodiment of the present application. On the basis of the above-described embodiments, referring to FIG. 8, the first conductive layer, the second conductive layer, the first trace layer, and the second trace layer each include a metal grid layer.

With this arrangement, the resistance of the touch-control electrode blocks 1 and the resistance of the touch-control traces 4 can be reduced, the requirement on the drive capability of the drive IC may be reduced, and the signal loss on the touch-control electrode blocks 1 and the touch-control traces 4 can be reduced. In addition, the touch-control electrode blocks 1 and the touch-control traces 4 adopt a metal grid, and grid positions of the touch-control electrode blocks 1 and the touch-control traces 4 may be located in a region between adjacent light-emitting units, so that the light emission of the light-emitting unit of the touch-control display apparatus is prevented from being blocked by the touch-control electrode blocks, thereby ensuring that the touch-control display apparatus has the good display effect.

Figure 9:
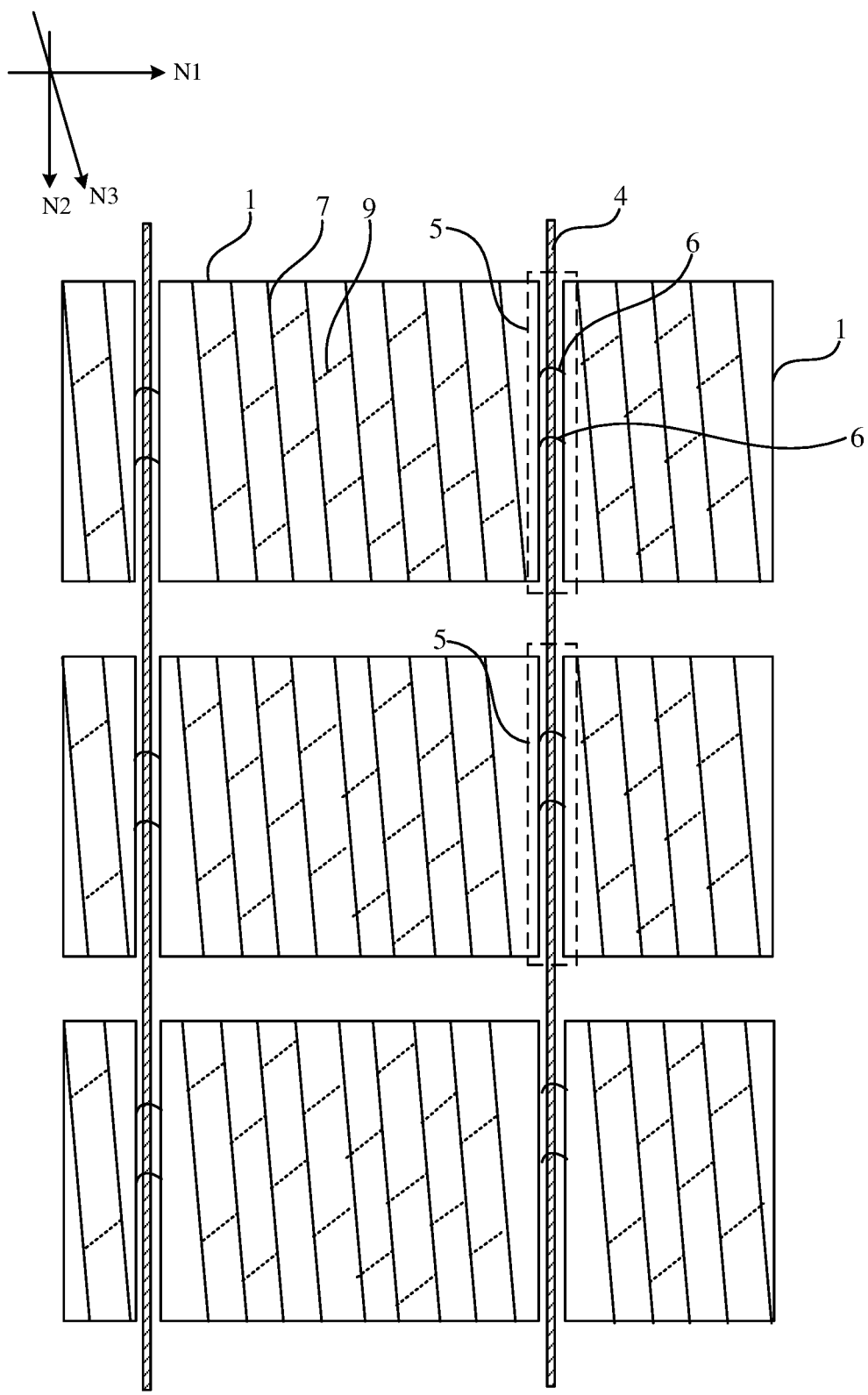
FIG. 9 is a schematic enlarged view of a touch-control panel of FIG. 8 at a region of D according to an embodiment of the present application.
Figure 10:
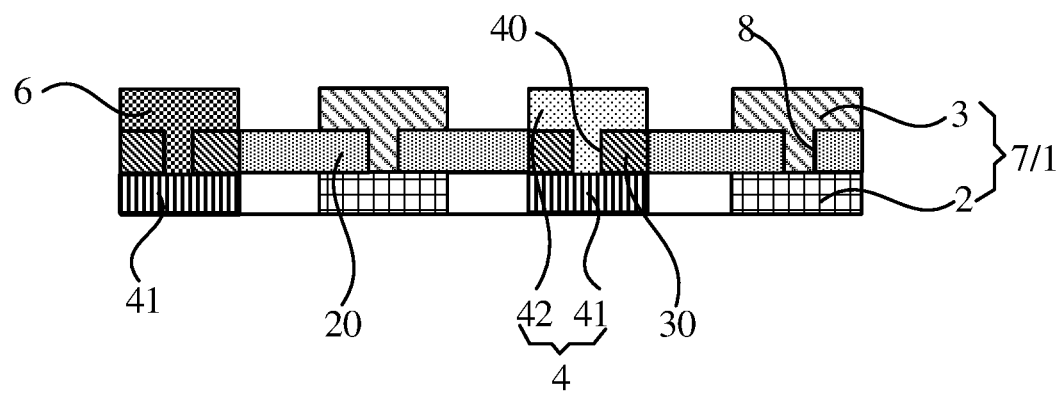
FIG. 10 is a schematic cross-sectional view of a touch-control panel of FIG. 8 taken along a direction of CC' according to an embodiment of the present application.

FIG. 9 is a schematic enlarged view of a touch-control panel of FIG. 8 at a region of D according to an embodiment of the present application. FIG. 10 is a schematic cross-sectional view of a touch-control panel of FIG. 8 taken along a direction of CC' according to an embodiment of the present application. On the basis of the above-described embodiments, in conjunction with FIGS. 9 and 10, the first conductive layer 2 and the second conductive layer 3 of each touch-control electrode block 1 each include multiple first grid lines 7 extending in the third direction N3 and multiple second grid lines 9 intersecting the multiple first grid lines 7. The multiple first grid lines 7 of the first conductive layer 2 and the second conductive layer 3 of each touch-control electrode block 1 are electrically connected through vias 8, the multiple second grid lines 9 of the first conductive layer 2 and the second conductive layer 3 of each touch-control electrode block 1 are electrically connected through the vias 8, and adjacent first grid lines 7 are connected by the second grid lines 9. The first trace layer 41 and the second trace layer 42 of each touch-control trace 4 each include multiple third grid lines 50 extending in the third direction N3 and multiple fourth grid lines 60 intersecting the multiple third grid lines 50. The multiple third grid lines 50 of the first trace layer 41 and the second trace layer 42 of each touch-control trace 4 are electrically connected through vias 40, the multiple fourth grid lines 60 of the first trace layer 41 and the second trace layer 42 of each touch-control trace 4 are electrically connected through the vias 40, and adjacent third grid lines 50 are connected by the fourth grid lines 60.

The third direction N3 may be the same as the first direction N1, or the third direction N3 may be different from the first direction N1. The first grid lines 7 and/or the third grid lines 50 may be straight lines, or may be fold lines or curve lines, as long as the first grid lines 7 and the third grid lines 50 extend as a whole in the third direction N3. Exemplarily, the first grid lines 7 and the third grid lines 50 may be matched with a shape of a boundary of the light-emitting unit of the touch-control display apparatus, and the first grid lines 7 and the third grid lines 50 are not overlapped with a vertical projection of the light-emitting unit. The second grid lines 9 intersecting the first grid lines as well as the fourth grid lines 60 intersecting the third grid lines may be matched with the shape of the boundary of the light-emitting unit of the touch-control display apparatus and be not overlapped with the vertical projection of the light-emitting unit.

Figure 11:
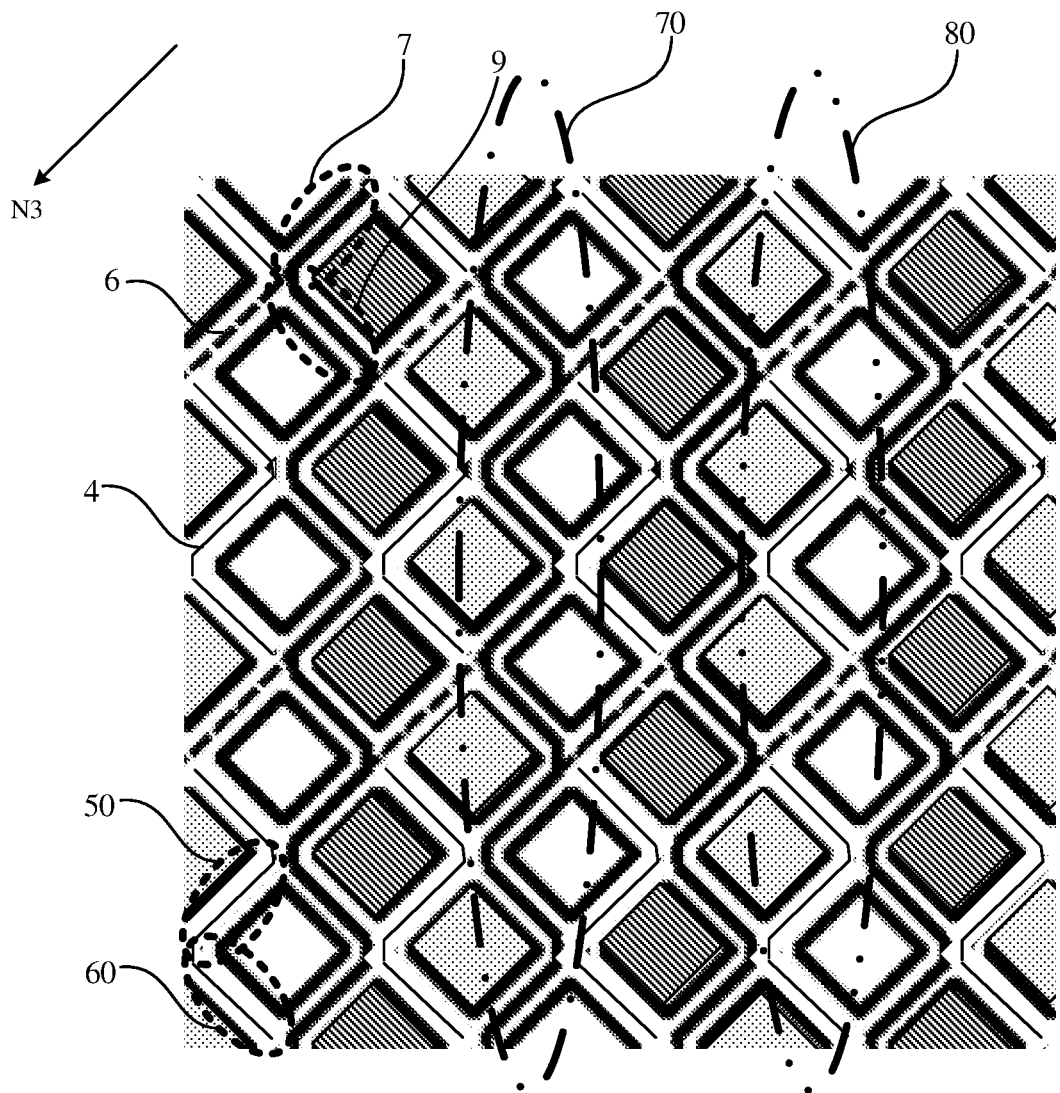
FIG. 11 is a schematic diagram of a first grid line of a touch-control panel according to an embodiment of the present application.
Figure 12:
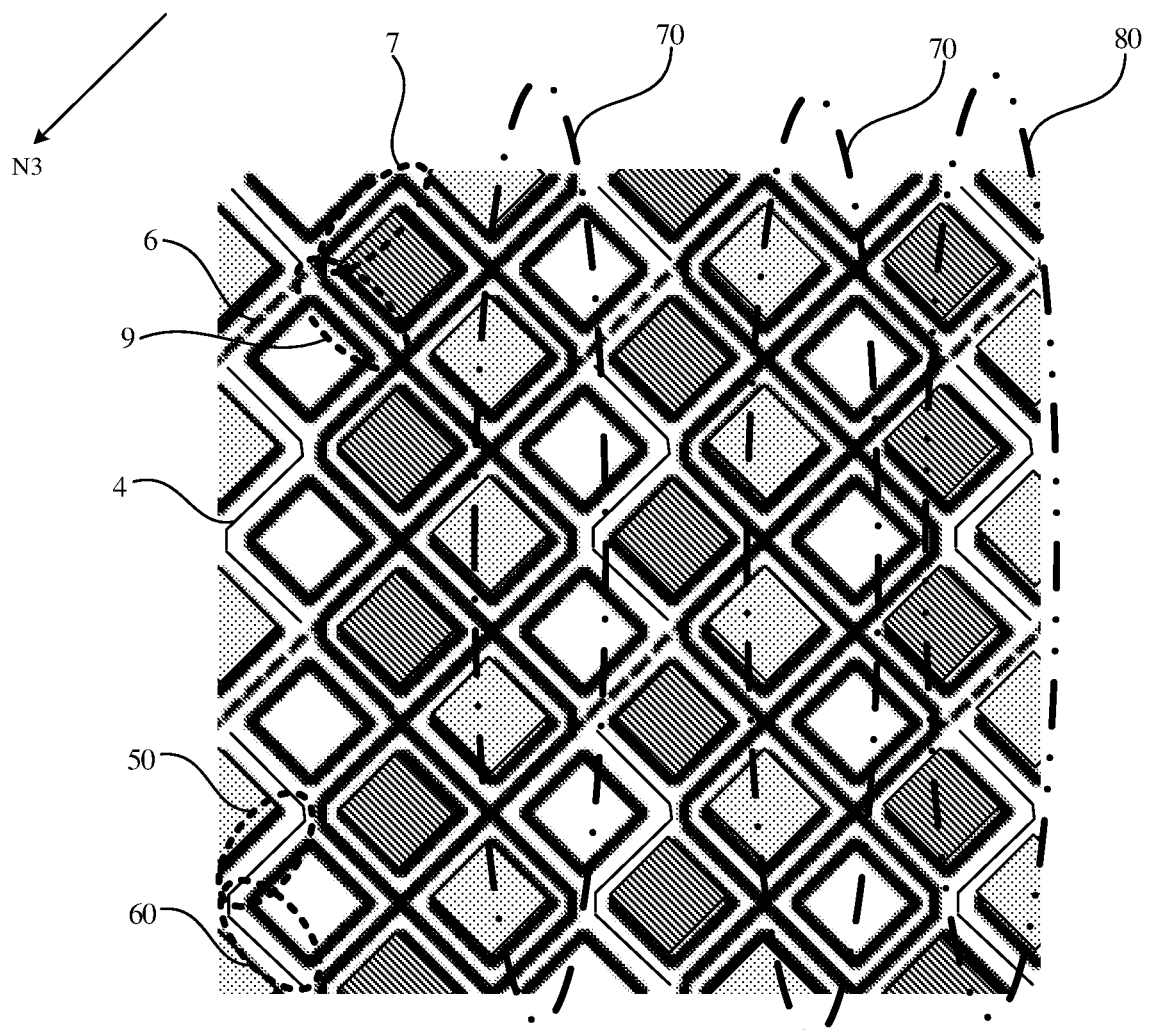
FIG. 12 is a schematic diagram of a first grid line of another touch-control panel according to an embodiment of the present application.
Figure 13:
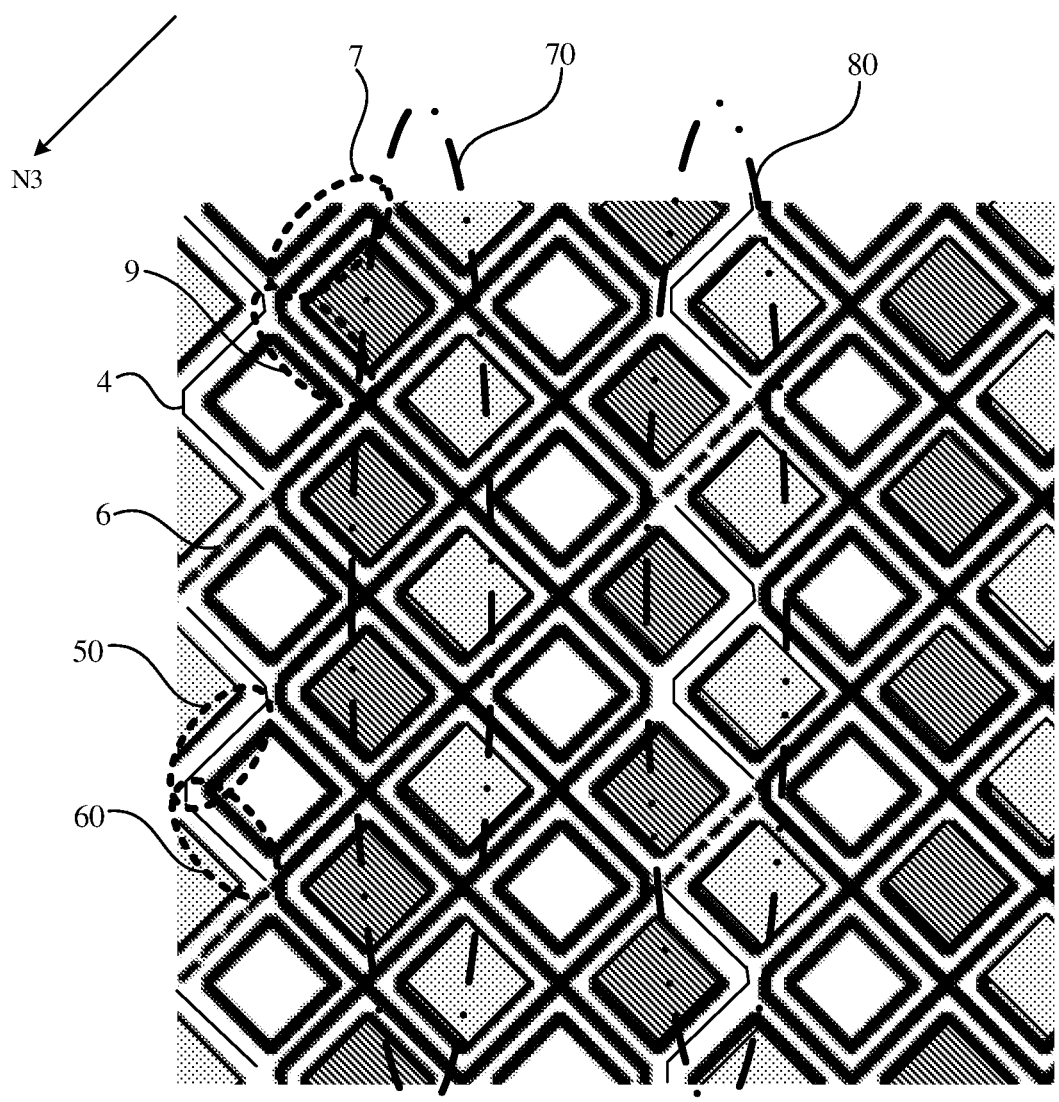
FIG. 13 is a schematic diagram of a first grid line of another touch-control panel according to an embodiment of the present application.
Figure 14:
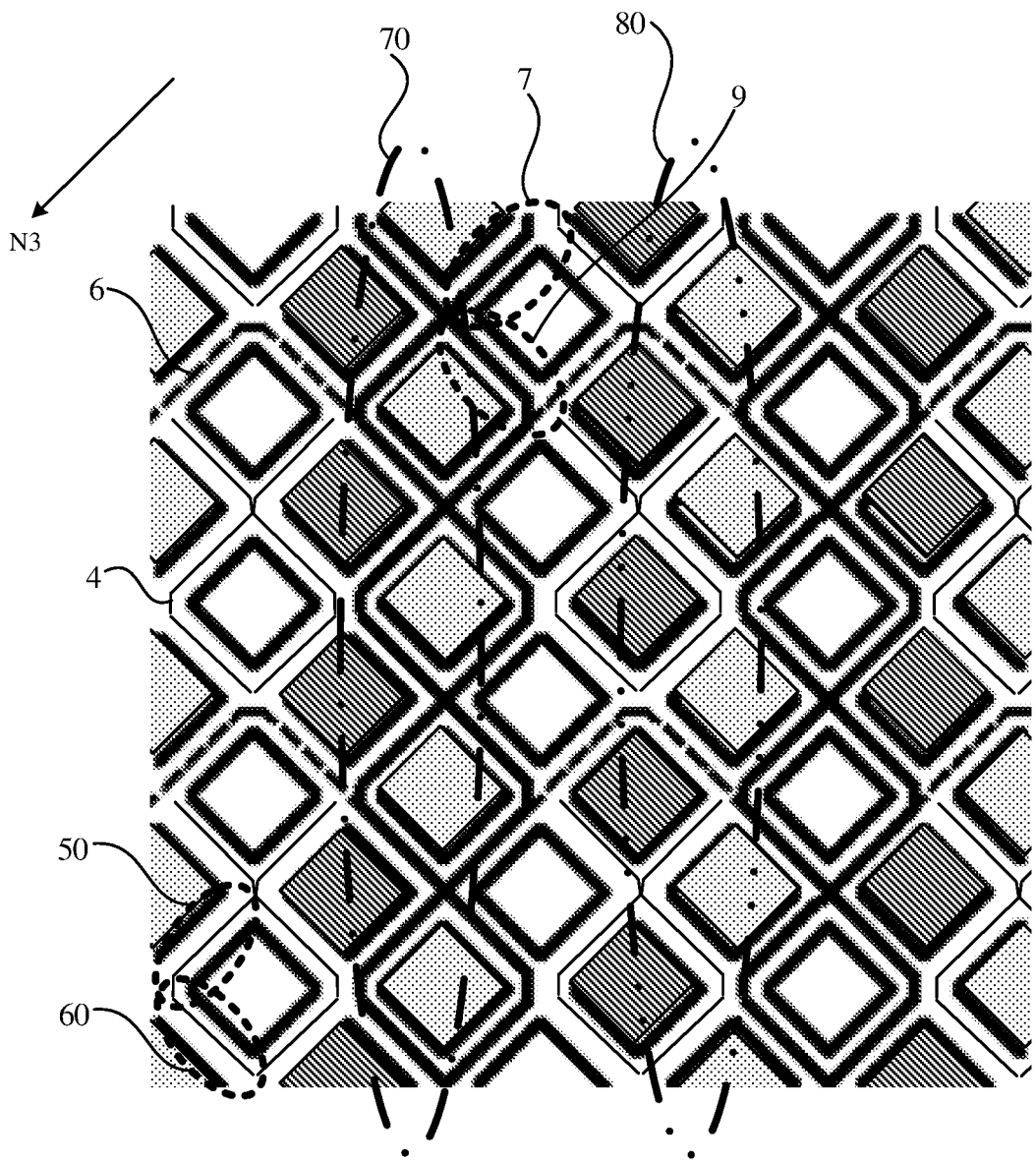
FIG. 14 is a schematic diagram of a first grid line of another touch-control panel according to an embodiment of the present application.

Exemplarily, FIG. 11 is a schematic diagram of a first grid line of a touch-control panel according to an embodiment of the present application. FIG. 12 is a schematic diagram of a first grid line of another touch-control panel according to an embodiment of the present application. FIG. 13 is a schematic diagram of a first grid line of another touch-control panel according to an embodiment of the present application. FIG. 14 is a schematic diagram of a first grid line of another touch-control panel according to an embodiment of the present application. FIGS. 11 to 14 exemplarily show one pixel arrangement of the light-emitting unit. In conjunction with FIGS. 11 to 14, the thick solid line and the thick dashed line may represent the touch-control electrode block, the thick solid line extending in the third direction N3 may represent the first grid line 7, the thick solid line connecting between adjacent first grid lines 7 may represent the second grid line 9, the touch-control trace 4 is represented by the thin solid line, and the dashed line between thin solid lines represents the jumper wire 6. In FIGS. 11 to 14, the second grid line 9 is on the same layer the first conductive layer 2 or the second conductive layer 3. The first grid line 7 and the second grid line 9 each include the first conductive layer 2 and the second conductive layer 3. With this arrangement, the first grid line 7 and the second grid line 9 each include two layers of conductive layers. For first grid lines 7 with the same width, by comparing first grid lines including two layers of conductive layers with first grid lines including a single layer of conductive layer, two layers of conductive layers disposed in a stacked manner being electrically connected is equivalent to the two layers of conductive layers of the first grid line 7 being connected in parallel, so that the resistance of the first grid line 7 is relatively small. Similarly, the second grid line 9 includes the first conductive layer 2 and the second conductive layer 3, so that the resistance of the second grid line 9 is relatively small, and further the resistance of the touch-control electrode block 1 is relatively small.

In conjunction with FIGS. 10 to 14, the first trace layer 41 and the second trace layer 42 of each touch-control trace 4 each include multiple third grid lines 50 extending in the third direction N3 and multiple fourth grid lines 60 intersecting the multiple third grid lines 50. The multiple third grid lines 50 of the first trace layer 41 and the second trace layer 42 of each touch-control trace 4 are electrically connected through vias, the multiple fourth grid lines 60 of the first trace layer 41 and the second trace layer 42 of each touch-control trace 4 are electrically connected through vias, and adjacent third grid lines 50 are connected by the fourth grid lines 60. With this arrangement, the third grid line 50 and the fourth grid line 60 each include two layers of trace layers. For third grid lines 50 with the same width, by comparing third grid lines including two layers of trace layers with third grid lines including a single layer of trace layer, two layers of third grid lines disposed in a stacked manner being electrically connected is equivalent to the two layers of trace layers of the touch-control trace being connected in parallel, so that the resistance of the third grid line 50 is relatively small. Similarly, the fourth grid line 60 includes the first trace layer 41 and the second trace layer 42, so that the resistance of the fourth grid line 60 is relatively small, and further the resistance of the touch-control trace 4 is relatively small, the requirement on the drive capability of the drive IC is reduced, the difficulty of the touch-control drive is reduced, and moreover, and moreover, the touch-control traces 4 have a relatively small resistance, which can reduce the voltage drop of signals transmitted on the touch-control traces 4, reduce the signal loss, and improve the touch-control sensitivity of the touch-control panel.

Figure 15:
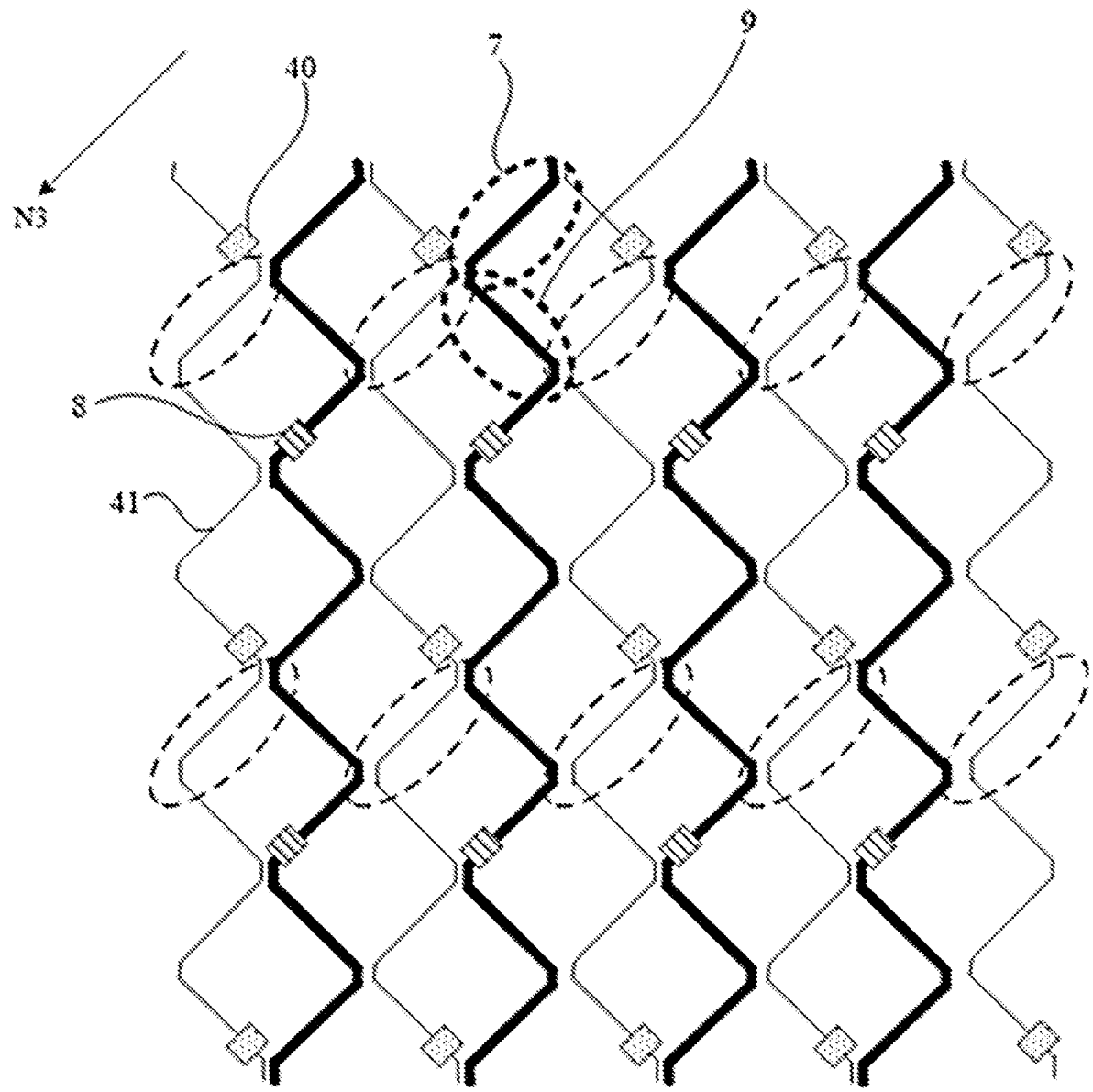
FIG. 15 is a schematic diagram of a first conductive layer of a touch-control panel according to an embodiment of the present application.
Figure 16:
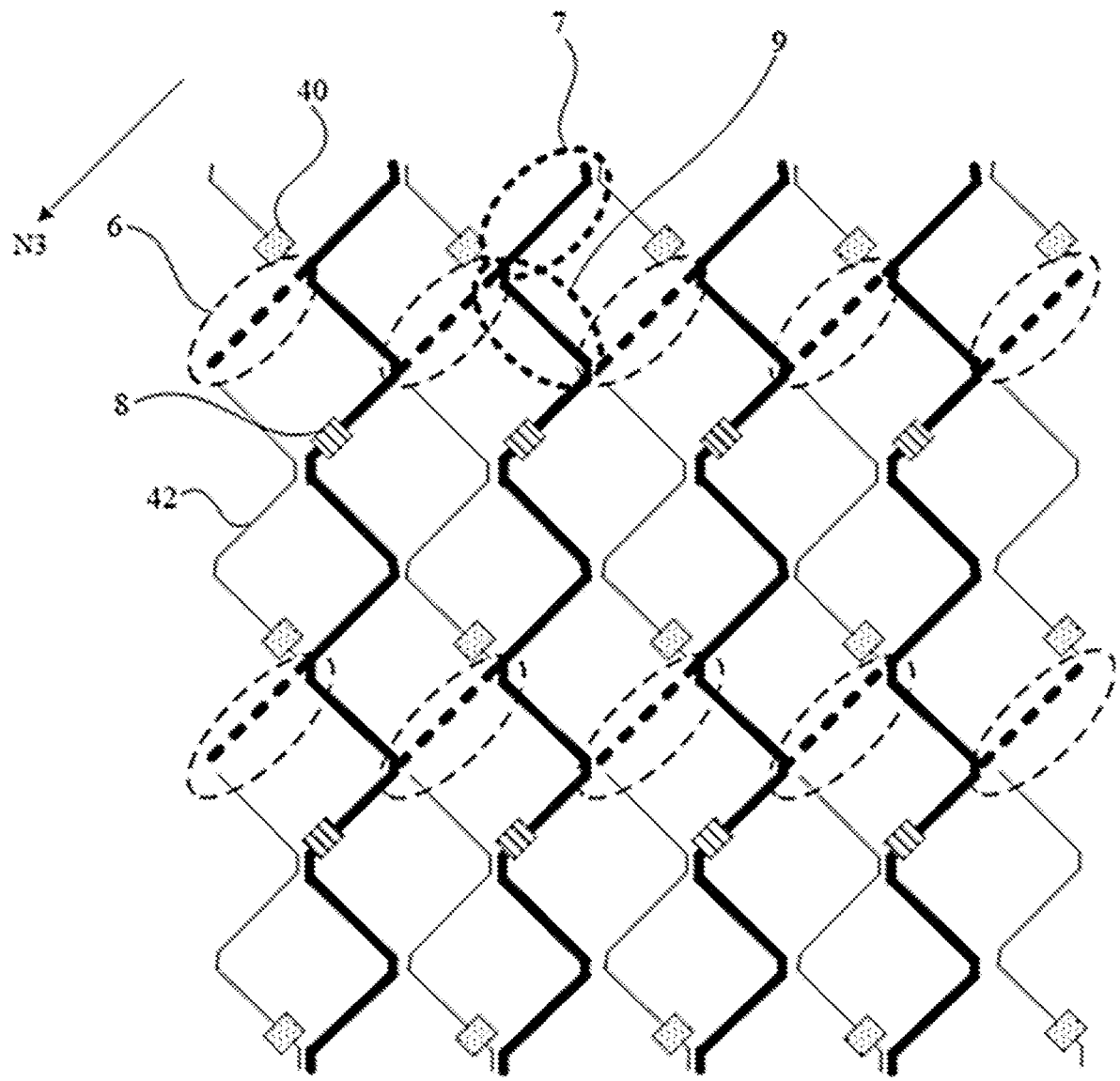
FIG. 16 is a schematic diagram of a second conductive layer of a touch-control panel according to an embodiment of the present application.

FIG. 15 is a schematic diagram of a first conductive layer of a touch-control panel according to an embodiment of the present application. FIG. 16 is a schematic diagram of a second conductive layer of a touch-control panel according to an embodiment of the present application. FIG. 16 exemplarily shows that the jumper wire 6 and the second conductive layer 3 are disposed on a same layer, FIG. 15 exemplarily shows a case that a portion where the touch-control traces 4 are overlapped with the jumper wire 6 includes only the first trace layer 41. On the basis of the above-described embodiments, in conjunction with FIGS. 10 to 16, the first grid line 7 and the second grid line 9 that are adjacent in the second direction N2 are electrically connected in sequence to form a fifth grid line 70, and at least two fifth grid lines 70 are included between two adjacent openings in the first direction N1. The third grid line 50 and the fourth grid line 60 that are adjacent in the second direction N2 are electrically connected in sequence to form a sixth grid line 80, and each touch-control trace 4 includes at least two sixth grid lines 80.

FIG. 11 exemplarily shows an arrangement case that fifth grid lines 70 of one touch-control electrode block are included between sixth grid lines 80 of two adjacent touch-control traces. With this arrangement, the touch-control trace 4 and the touch-control electrode block are arranged alternately, and the touch-control trace 4 and the touch-control electrode block are located in a same region, so that the total area of the touch-control region and the wiring region of the touch-control panel can be reduced, and the area of the touch-control panel can be reduced, thereby reducing the area occupied by the touch-control panel in the touch-control display apparatus. Both the touch-control trace 4 and the touch-control electrode block may be disposed in the display region, the touch-control trace 4 does not need to occupy the frame region, so that the trace space in the frame region of the touch-control display apparatus is saved, and the narrow frame of the touch-control display apparatus is achieved, and moreover, the facing area of the touch-control electrode blocks and touch-control traces 4 connected to other touch-control electrode blocks is greatly reduced, whereby the parasitic capacitance between the touch-control electrode blocks and the touch-control traces 4 connected to other touch-control electrode blocks is significantly reduced, and thus the touch-control precision of the touch-control panel is improved.

FIG. 12 exemplarily shows an arrangement case that three fifth grid lines 70 of the touch-control electrode block are included between sixth grid lines 80 of two adjacent touch-control traces. With this arrangement, the three fifth grid lines 70 of the touch-control electrode block between the sixth grid lines 80 of the two adjacent touch-control traces are electrically connected to each other, so that compared with the arrangement case shown in FIG. 11, the coverage area of the touch-control electrode block between the sixth grid lines 80 of the two adjacent touch-control traces is larger, and the three adjacent fifth grid lines 70 are connected in parallel, thereby reducing the resistance of the touch-control electrode block.

FIG. 13 exemplarily shows an arrangement case that four fifth grid lines 70 of the touch-control electrode block are included between sixth grid lines 80 of two adjacent touch-control traces.

With this arrangement, the four fifth grid lines 70 of the touch-control electrode block between the sixth grid lines 80 of the two adjacent touch-control traces are electrically connected to each other, so that compared with the arrangement cases shown in FIGS. 11 and 12, the coverage area of the touch-control electrode block between the sixth grid lines 80 of the two adjacent touch-control traces is larger, and the four adjacent fifth grid lines 70 are connected in parallel, thereby reducing the resistance of the touch-control electrode block.

FIG. 14 exemplarily shows an arrangement case that sixth grid lines 80 of two adjacent touch-control traces are connected in parallel to form a group of touch-control traces, and two fifth grid lines 70 of the touch-control electrode block are included between every two adjacent groups of touch-control traces. With this arrangement, the two fifth grid lines 70 of the touch-control electrode block between every two adjacent groups of touch-control traces are connected in parallel, compared with the arrangement cases shown in FIGS. 11, 12 and 13, two sixth grid lines of the touch-control trace are connected in parallel, thereby reducing the resistance of the touch-control trace.

In conjunction with FIGS. 10, 11, 15 and 16, the first conductive layer 2 and the second conductive layer 3 of the first grid line 7 of each touch-control electrode block 1 are electrically connected through the via 8, and the via 8 on the first grid line 7 may be disposed at any position of the first grid line 7. The first trace layer 41 and the second trace layer 42 of each touch-control trace 4 are electrically connected by the via 40. Each touch-control electrode block 1 and the touch-control trace 4 connected to the each touch-control electrode block 1 are connected through the via disposed at the jumper wire 6. The jumper wire 6 and the second conductive layer 3 are disposed on a same layer, and the portion where the touch-control traces 4 are overlapped with the jumper wire 6 includes only the first trace layer 41. On the one hand, the facing area of the touch-control electrode blocks 1 and the touch-control traces 4 connected to other touch-control electrode blocks 1 is only a region where the jumper wire 6 is located, so that in a region outside the region where the jumper wire 6 is located, the facing area of the touch-control electrode blocks 1 and the touch-control traces 4 connected to other touch-control electrode blocks 1 is greatly reduced, so that the parasitic capacitance between the touch-control electrode blocks 1 and the touch-control traces 4 connected to other touch-control electrode blocks 1 is significantly reduced, and thus the touch-control precision of the touch-control panel is improve. On the other hand, the jumper wire 6 and the second conductive layer 3 are disposed on a same layer, so that the area of the second conductive layer 3 of the touch-control electrode block 1 is relatively large, the touch-control capacitance formed between the touch-control electrode block 1 and the finger near the touch-control panel is relatively large, and thus the touch-control effect of the touch-control panel is improved.

In some embodiments, with continued reference to FIG. 8, each touch-control trace 4 is electrically connected to one touch-control electrode block 1, and one touch-control electrode block 1 is electrically connected to at least one touch-control trace 4.

Each touch-control trace 4 is electrically connected to one touch-control electrode block 1, so that each touch-control trace 4 may input a drive signal to the touch-control electrode block 1 electrically connected to the each touch-control trace 4. During the touch-control detection, the drive IC 600 sends a touch-control signal to the touch-control electrode block 1 electrically connected to the touch-control trace 4 through the touch-control trace 4 so as to charge the touch-control electrode block 1, and detects a capacitance value on the touch-control electrode blocks 1 in real time, where the touch-control signal may be a pulse signal. When the finger is close to the touch-control panel 100, a touch-control capacitance is formed between the each touch-control electrode block 1 and the finger close to the touch-control panel 100, and the drive IC 600 may detect a touch-control position of the finger through detecting a change in the capacitance of the each touch-control electrode block 1 by means of the touch-control trace 4. Each touch-control trace 4 is electrically connected to one touch-control electrode block 1, so that the signal crosstalk can be avoided, and thus the touch-control effect of the touch-control panel can be improved. One touch-control electrode block 1 is configured to be electrically connected to at least one touch-control trace 4, and one touch-control electrode block 1 may be configured to be electrically connected to one touch-control trace 4, or two or three touch-control trace 4, so that the touch-control trace connected to the touch-control electrode block is prevented from being broken, thereby improving the touch-control reliability of the touch-control panel.

Figure 17:
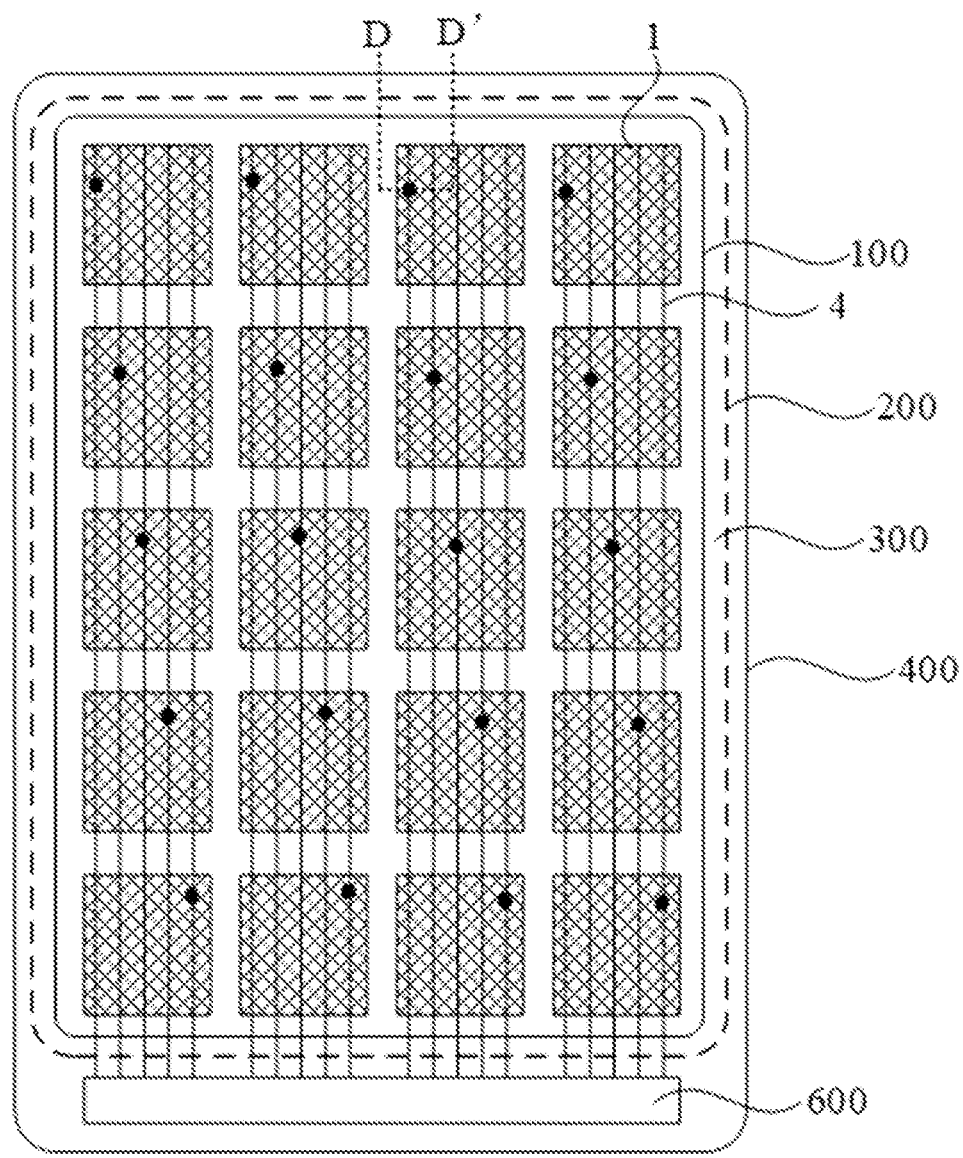
FIG. 17 is a schematic structural diagram of a touch-control display apparatus according to an embodiment of the present application.

FIG. 17 is a schematic structural diagram of a touch-control display apparatus according to an embodiment of the present application. On the basis of the above-described embodiments, referring to FIG. 17, a touch-control display apparatus 400 according to the embodiment of the present application includes a display panel 200 disposed in a stacked manner and the touch-control panel 100 provided in any of the above-described embodiments. The display panel 200 includes a display region 300, and the touch-control electrode blocks 1 are correspondingly disposed in the display region 300.

Figure 18:
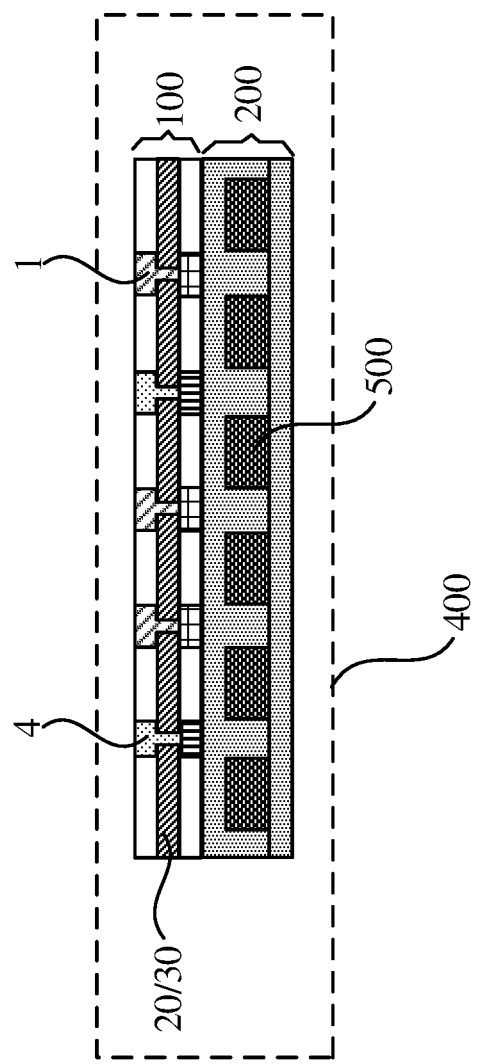
FIG. 18 is a schematic cross-sectional view of a touch-control panel of FIG. 15 taken along a direction of DD' according to an embodiment of the present application.

FIG. 18 is a schematic cross-sectional view of a touch-control panel of FIG. 15 taken along a direction of DD' according to an embodiment of the present application. The display panel 200 includes multiple light-emitting units 500, and vertical projections of the multiple touch-control electrode blocks 1 and the multiple touch-control traces 4 on the display panel 200 are not overlapped with the multiple light-emitting units 500.

Since the touch-control traces 4 are configured to penetrate through the opening of the touch-control electrode blocks 1, both the touch-control traces 4 and the touch-control electrode blocks 1 are disposed in the display region 300 of the display panel 200, and the vertical projections of the touch-control electrode blocks 1 and the touch-control traces 4 on the display panel 200 are not overlapped with the light-emitting units 500, so that the touch-control electrode blocks 1 and the touch-control traces 4 do not affect the light emission of the light-emitting units 500. The touch-control display apparatus provided in the embodiment of the present application may include a mobile phone, a tablet computer, a wearable device, and the like.

Referring to FIGS. 17 and 18, the touch-control display apparatus 400 further includes a drive IC 600. The drive IC 600 is configured to drive the display panel 200 to display a picture, and the drive IC 600 is further configured to send a drive signal to the touch-control electrode blocks 1 of the touch-control panel 100 and receive an inductive signal on the touch-control electrode blocks 1.

According to the touch-control panel provided in this embodiment, the each touch-control electrode block includes the first conductive layer and the second conductive layer disposed in a stacked manner, and the first conductive layer and the second conductive layer of the each touch-control electrode block are electrically connected, so that the resistance of the each touch-control electrode block is relatively small, the requirement on the drive capability of the touch-control drive IC is reduced, whereby the touch-control panel may adopt the same drive IC as the display panel, and further, the cost of the touch-control panel is reduced, and thus the cost of the touch-control display apparatus is reduced, moreover, the space occupied by the touch-control panel in the touch-control display apparatus is reduced, which is conductive to reducing the volume of the touch-control display apparatus.

What is claimed is:

1. A touch-control panel, comprising:
a plurality of touch-control electrode blocks, wherein each touch-control electrode block of the plurality of touch-control electrode blocks comprises a first conductive layer and a second conductive layer disposed in a stacked manner, a first insulating layer is disposed between the first conductive layer and the second conductive layer, and the first conductive layer of the each touch-control electrode block and the second conductive layer of the each touch-control electrode block are electrically connected; and a plurality of touch-control traces configured to input a drive signal to the plurality of touch-control electrode blocks, wherein each touch-control trace of the plurality of touch-control traces comprises a first trace layer and a second trace layer disposed in a stacked manner, a second insulating layer is disposed between the first trace layer and the second trace layer, and the first trace layer of the each touch-control trace and the second trace layer of the each touch-control trace are electrically connected;
wherein the first conductive layer and the first trace layer are disposed on a same layer, the second conductive layer and the second trace layer are disposed on a same layer, and the first insulating layer and the second insulating layer are disposed on a same layer.

2. The touch-control panel of claim 1, wherein,
touch-control electrode blocks sequentially arranged in a second direction form a touch-control electrode column, a plurality of touch-control electrode columns are sequentially arranged in a first direction, and the second direction and the first direction intersect each other;
the touch-control electrode block further comprises at least one opening extending in the second direction, the touch-control trace extends in the second direction, and the each touch-control trace penetrates through at least one opening; and
the touch-control electrode block further comprise at least one jumper wire, and the at least one jumper wire is configured to be electrically connected to regions, located on two sides of the at least one opening, of the touch-control electrode block.

3. The touch-control panel of claim 2, wherein openings comprised in the touch-control electrode block of the plurality of touch-control electrode blocks are the same in number, and openings through which each of the plurality of touch-control traces penetrates are the same in number.

4. The touch-control panel of claim 2, wherein,
the at least one jumper wire and the first conductive layer are disposed on a same layer, and a portion where the touch-control trace is overlapped with the at least one jumper wire comprises the second trace layer; or
the at least one jumper wire and the second conductive layer are disposed on a same layer, and a portion where the touch-control trace is overlapped with the at least one jumper wire comprises the first trace layer.

5. The touch-control panel of claim 2, wherein the first conductive layer, the second conductive layer, the first trace layer and the second trace layer each comprise a cross-trace layer.

6. The touch-control panel of claim 5, wherein the cross-trace layer is a metal grid layer.

7. The touch-control panel of claim 6, wherein,
the first conductive layer of the each touch-control electrode block and the second conductive layer of the each touch-control electrode block each comprise a plurality of first grid lines and a plurality of second grid lines, the plurality of first grid lines extend in a third direction, the plurality of second grid lines intersects the plurality of first grid lines, and adjacent first grid lines among the plurality of first grid lines are connected through a respective second grid line of the plurality of second grid lines; and
the first trace layer of the touch-control trace and the second trace layer of the touch-control trace each comprise a plurality of third grid lines and a plurality of fourth grid lines, the plurality of third grid lines extend in the third direction, the plurality of fourth grid lines intersect the plurality of third grid lines, and adjacent third grid lines among the plurality of third grid lines are connected through a respective fourth grid line of the plurality of fourth grid lines.

8. The touch-control panel of claim 7, wherein,
at least one of the plurality of first grid lines and the plurality of second grid lines of the first conductive layer and the second conductive layer of the touch-control electrode block are electrically connected through vias; and
at least one of the plurality of third grid lines and the plurality of fourth grid lines of the first trace layer and the second trace layer of the touch-control trace are electrically connected through vias.

9. The touch-control panel of claim 7, wherein the third direction is the same as the first direction.

10. The touch-control panel of claim 7, wherein the third direction is different from the first direction.

11. The touch-control panel of claim 7, wherein at least one of the plurality of first grid lines and the plurality of third grid lines are straight lines, fold lines, or curve lines.

12. The touch-control panel of claim 7, wherein the plurality of first grid lines and the plurality of third grid lines are matched with a shape of a boundary of a light-emitting unit of a touch-control display apparatus, and the plurality of first grid lines and the plurality of third grid lines are not overlapped with a vertical projection of the light-emitting unit of the touch-control display apparatus.

13. The touch-control panel of claim 7, wherein the plurality of second grid lines and the plurality of fourth grid lines are matched with a shape of a boundary of a light-emitting unit of a touch-control display apparatus, and the plurality of second grid lines and the plurality of fourth grid lines are not overlapped with a vertical projection of the light-emitting unit of the touch-control display apparatus.

14. The touch-control panel of claim 7, wherein,
first grid lines and second grid lines which are adjacent in the second direction are electrically connected in sequence to form a plurality of fifth grid lines, and at least two fifth grid lines among the plurality of fifth grid lines are provided between two adjacent openings in the first direction; and
third grid lines and fourth grid lined which are adjacent in the second direction are electrically connected in sequence to form a plurality of six grid lines, and the touch-control trace comprises at least two six grid lines.

15. The touch-control panel of claim 7, wherein the first conductive layer and the second conductive layer of the plurality of first grid lines of the touch-control electrode block are electrically connected by vias, and the vias are located on the plurality of first grid lines.

16. The touch-control panel of claim 7, wherein the each touch-control electrode block and a touch-control trace connected to the touch-control electrode block are connected by a via disposed at the at least one jumper wire.

17. The touch-control panel of claim 1, wherein,
the touch-control trace is electrically connected to one touch-control electrode block among the plurality of touch-control electrode blocks; and
one touch-control electrode block among the plurality of touch-control electrode blocks is electrically connected to at least one touch-control trace among the plurality of touch-control traces.

18. A touch-control display apparatus, comprising a display panel disposed in a stacked manner and the touch-control panel of claim 1, wherein the display panel comprises a display region, and the plurality of touch-control electrode blocks in the touch-control panel are correspondingly disposed in the display region.

19. The touch-control display apparatus of claim 18, wherein,
the display panel comprises a plurality of light-emitting units;
vertical projections of the plurality of touch-control electrode blocks and the plurality of touch-control traces in the touch-control panel on the display panel are not overlapped with the plurality of light-emitting units; and
the touch-control display apparatus further comprises a drive integrated circuit chip (IC) configured to drive the display panel to display a picture.

20. The touch-control display apparatus of claim 19, wherein the drive IC is further configured to send a drive signal to the plurality of touch-control electrode blocks of the touch-control panel and receive an inductive signal on the plurality of touch-control electrode blocks.

* * * * *